United States Patent [19]
Daigle et al.

[11] 3,975,560
[45] Aug. 17, 1976

[54] PHOSPHORUS AND NITROGEN CONTAINING RESINS FOR FLAMEPROOFING ORGANIC TEXTILES

[75] Inventors: Donald J. Daigle, New Orleans; Armand B. Pepperman, Jr., Metairie; Sidney L. Vail, River Ridge, all of La.

[73] Assignee: The United States of America as represented by the Secretary of Agriculture, Washington, D.C.

[22] Filed: Aug. 22, 1974

[21] Appl. No.: 499,807

[52] U.S. Cl. .............................. 427/341; 8/116 P; 106/15 FP; 252/8.1; 260/606.5 P; 427/342; 427/390
[51] Int. Cl.² ...................... C09D 5/18; C07F 9/50
[58] Field of Search ..................... 117/62.2, 136; 260/606.5 P; 8/116 P; 252/8.1; 106/15 FP; 427/341, 342, 390

[56] References Cited
UNITED STATES PATENTS

| | | | |
|---|---|---|---|
| 3,745,191 | 7/1973 | Daigle et al. ................. | 260/606.5 P |
| 3,868,269 | 2/1975 | Daigle et al. ................. | 117/136 |

*Primary Examiner*—Michael R. Lusignan
*Attorney, Agent, or Firm*—M. Howard Silverstein; David G. McConnell; Salvador J. Cangemi

[57] ABSTRACT

Soluble adduct polymers were allowed to react with nitrogenous compounds such as urea, trimethylolmelamine, and ammonia to (a) prepare flame resistant polymers and (b) prepare flame-, glow-, wrinkle-, and shrink-resistant woven and knit textiles which contain 25% or more cellulosic fibers.

2 Claims, No Drawings

PHOSPHORUS AND NITROGEN CONTAINING RESINS FOR FLAMEPROOFING ORGANIC TEXTILES

This invention relates to flame-resistant polymers and to flame-resistant fibrous organic materials produced from these polymers. More particularly, it relates to new phosphorus- and nitrogen-containing finishes obtained by solubilizing phosphorous and nitrogen-containing polymers (or precipitates) and application of these solubilized polymers to fibrous organic materials. It further provides a process for preparing nitrogen- and phosphorus-containing solubilized polymers and methods of their utilization in the production of new flame-resistant polymers and for the production of flame-resistant fibrous organic materials, such as cellulose and cellulose-containing textiles.

As employed throughout the specifications and claims of this invention, the term "adduct polymer" refers to these solubilized polymers, i.e., the product formed by solubilizing unoxidized polymer containing phosphorus and nitrogen in solutions containing formaldehyde and an acid. The chemistry involved in the solution of these polymers by the addition of formaldehyde and an acid is not known, but it is believed that chemical reactions occur which modify the polymers by altering the chain length and/or by addition of the reactants to the polymer or products therefrom.

The abbreviation THP refers to the compound tris(hydroxymethyl)phosphine, $(HOCH_2)_3P$. The term tetrakis(hydroxymethyl)phosphonium salt refers to that class of compounds in which four hydroxymethyl groups are bonded to a phosphorus atom which is in the phosphonium state, that is, has a plus charge associated with it and the anion can be the anion of any organic or inorganic acid or combinations thereof such as acetic, oxalic, hydrochloric, or phosphoric. The abbreviation THpc refers to the compound tetrakis(hydroxymethyl)phosphonium chloride. The term tetrakis(hydroxymethyl)phosphonium hydroxide or THPOH refers to a solution prepared by neutralizing any tetrakis(hydroxymethyl)phosphonium salt with any suitable base, inorganic or organic, such as sodium hydroxide or triethanolamine.

Copending application filed Aug. 22, 1974 Ser. No. 499,804 relates to the production of soluble polymer adducts and to the use of these products with phenols and substituted phenols for the treatment of organic fibrous material in a heat cure procedure for the production of flame-resistant organic fibrous textiles.

Copending application filed Aug. 22, 1974 Ser. No. 499,803 relates to the use of soluble adduct polymer and to the use of these products with certain nitrogenous compounds for the treatment of organic fibrous materials in either a heat or chemical cure procedure for the production of flame resistant organic fibrous textiles. These polymers were solubilized by the use of formaldehyde and a hydroxymethylphosphonium salt.

Copending application filed Aug. 22, 1974 Ser. No. 499,806 relates to the production of soluble adduct polymers and to their use with phenols and substituted phenols for the treatment of organic fibrous materials in a heat cure procedure for the production of flame resistant organic fibrous textiles. These polymers were solubilized by the use of formaldehyde and a hydroxymethylphosphonium salt.

A primary object of the present invention is to provide adduct-polymers which are stable toward further reaction during storage but which are capable of reaction with certain nitrogenous agents to produce flame resistant polymers and flame resistant organic textiles and to provide flame-resistant organic textile structures by insolubilizing polymer adducts in the textile structure without the need for heating the the textile which generally reduces the strength of the so-treated product.

Polymers of various types can be prepared by reacting tetrakis(hydroxymethyl) phosphonium salts, tris(hydroxymethyl)phosphine, phosphine, tetrakis(hydroxymethyl)phosphonium 27 hydroxide or combinations thereof with ammonia, diamines, such as ethylenediamine and 1,6 hexamethylenediamine, hexamethylene tetramine or combinations thereof. We have now discovered that these polymers can be solubilized by addition of formalin and acid. We have also discoveed that these adduct polymers can be further reacted with nitrogen compounds which contain at least two members of the group consisting of hydrogen atoms or methylol radicals attached to the trivalent nitrogen to produce new nitrogen and phosphorus containing poymers or flame- and wrinkle-resistant textile products. We have also discovered these soluble adduct polymers can react and be insolubilized within or on fibrous organic textiles by impregnating the textile with the soluble adduct polymers, then drying the impregnated products, and finally exposing the dry textile to ammonia or a gaseous amine. The resulting insolubilized nitrogen- and phosphorus-containing polymer is durable to laundering and dry cleaning.

More specifically, the products and processes of our invention may be described as follows (1) insoluble polymers are prepared by reacting THP (either in the presence of formaldehyde or not) with ammonia, diamines, or hexamethylenetetramine or mixtures of these. Insoluble polymers may also be prepared by utilizing tetrakis(hydroxymethyl)phosphonium salts in lieu of THP. The mole ratio may vary from 1:4 to 4:1 of amine to phosphorus compound. The preferred molar ratio is 1:1 with THP and tetrakis(hydroxymethyl)phosphonium hydroxide and 2:1 with tetrakis(hydroxymethyl)phosphonium chloride (2). To solubilize these polymers, the solid polymer is mixed with formalin solution and an added acid. The ratio of formaldehyde added to phosphorus contained in the polymer can vary from 1:4 to 4:1. The preferred ratio is 1:1. The ratio of acid to phosphorus contained in the polymer can vary from 1.10 to 2:1. The preferred ratio is 1:2 (3). To produce insoluble polymers in accordance with this invention the adduct polymer is reacted with a nitrogenous compound containing at least two members of the group consisting of hydrogen atoms or methylol radicals attached to trivalent nitrogen atom. The reaction is carried out by dissolving the nitrogenous compound in the solution containing the adduct polymer and then heating is needed until a viscous solution and finally a solid polymer is produced. The polymers produced by this process are insoluble and flame resistant (4). To produce chemically cured polymers in accordance with this invention the adduct polymer is reacted with a nitrogenous compound containing at least two members of the groups consisting of hydrogen atoms attached to trivalent nitrogen. The reaction is carried out by adding the nitrogenous compound to the solution containing the adduct polymers. The insoluble polymer forms almost instantaneously and the polymers produced by this process are insoluble and flame resistant (5). To produce flame resistant organic textiles the textile structure is wetted with a solution containing the adduct polymer and nitrogenous compound containing at least two members of the group consisting of hydrogen atoms or methylol radicals attached to trivalent nitrogen atoms, then drying and heating the textile at an elevated temperature ranging from about 90° to 170°C for a period of time necessary to promote reaction of the adduct polymer and the nitrogenous agent, within or on the textile structure (6). To produce flame resistant organic textiles the solution containing the adduct polymer may or may not be neutralized by an organic or an inorganic base to a higher pH before impregnating or wetting the fibrous organic textile structure. The textile is dried partially or completely at a temperature from about 70° to 130°C. The dried fabric is exposed to sufficient vapors of ammonia or an amine to react an insolubilize the adduct polymer in or on the textile structure. Textile structures treated in accordance with this process can exhibit tensile strength properties about equal to or greater than their original tensile properties if the pH of the treating solution is between 6 and 8 preferably 7.

Nitrogenous compounds suitable for use in preparing the polymers or solutions to produce flame resistant organic textiles are virtually any essentially monomeric nitrogenous compound which contains at least two members of the group consisting of hydrogen atoms or methylol radicals attached to trivalent nitrogen. Suitable nitrogenous amides include cyanamide, formamide, urea, thiourea, melamine, acrylamide, octadecylamide, and the methylol derivatives of these amides. Sulfonamides and phosphoramides are also suitable.

Gaseous nitrogenous compounds suitable for reacting with and insolubilizing the adduct polymers in the textile structure include ammonia, methylamine, and ethylamine. While the preferred technique for applying these amines is by forcing the gas through the textile structure, other techniques can be used such as merely exposing the textile to an atmosphere composed essentially of a suitable amine.

The preferred solvent is water, however, solvents such a methanol, ethanol, isopropanol, dimethylformamide, dimethyl sulfoxide, and the like may be used to replace some of the water used as the solvent. Catalysts are generally not needed to promote the reaction of the adduct polymer with the nitrogenous compounds to form the insoluble polymers. The pH of the reacting system is dependent upon the acid and the amount used.

The preferred relative amounts of adduct polymer and nitrogen compounds used for reaction can be calculated by assuming one mole of phosphorus which is contained in the adduct polymer reacts with one mole of the nitrogenous compound.

All of the polymers produced in accordance with this invention contain phosphorus and this atom can be oxidized with oxidants such as peroxides, perborates, and peracids to the phosphine oxide state. The amount of oxidizing agent needed to oxidize the phosphorus atom is dependent upon the amount present on the fabric. Generally, a 0.5% to 3% solution of the oxidizing agent is adequate.

The following examples illustrate but do not limit the scope of this invention.

EXAMPLE 1

The original or phosphine polymers were prepared by reacting the appropriate phosphorus compounds with the amine or diamine as described in Table I. All of the polymers were filtered from the mother liquor, washed with water, ethanol, and methanol and left to air dry for 8 days. The polymers were then bottled and used to prepare the adduct polymers. In Table II, the preparation of the adduct polymer from formaldehyde, acid, and polymer are described. organic fibrous materials were impregnated with a solution of the adduct polymer and then dried in an oven. The dried fibrous structures were then exposed to either gaseous alkyl amine or ammonia to react and insolubilize a polymer in or on the fibers. All of the products contained phosphorus and nitrogen after washing in water and drying and exhibited flame resistance as measured by the match test [see Textile Research J. 27, 294–299 (1957)]. In Table III are shown the fibrous materials treated, the polymer adduct solution of Table II used to treat the fibrous product, the amine used to react and insolubilize a pplymer, the polymers formed, and a brief description of each product.

EXAMPLE 2

The nitrogenous agents were added to solutions of the adduct polymer as described in Table II to produce solutions as described in Table IV. These solutions were used to (a) make insoluble polymers and (b) produce flame resistant organic fibrous materials. Aliquots of the solutions were heated from about 120°–150°C to produce flame resistant polymers. These are described in Table V. To produce flame resistant fibrous materials the textile structures were impregnated with the solutions of Table IV, then heated to produce insoluble polymers in or on the fibrous structure. In Table VI are shown the fibrous materials treated, the solution of Table IV used to treat the fibrous material and a brief description of each product.

TABLE I

| Phosphine Polymers | | |
|---|---|---|
| Polymer No. | Reactants | % P in Polymer |
| 1 | 1500g. 40% THPOH (Thpc neutralized with sodium hydroxide); 205g. ammonium hydroxide (NH$_4$OH) which calculates as 29% ammonia (NH$_3$) | 31.8 |
| 2 | 238g. Thpc (80%); 238g. H$_2$O; 175g. NH$_4$OH (29% NH$_3$) | 23.4 |
| 3 | 160g. THP (80%); 200g. water; 105g. Hexamethylenetetramine | 29.9 |
| 4 | 430g. 40% THPOH (Thpc neutralized with sodium hydroxide); 105g. Hexamethylene-tetramine | 35.4 |
| 5 | 573g. 40% THPOH (Thpc neutralized with sodium hydroxide); 61.2g. ethylenediamine (98%) | 29.5 |
| 6 | 573g. 40% THPOH (Thpc neutralized with sodium hydroxide); 162g. 1,6 hexamethylenediamine (70%) | 21.5 |

TABLE II

SOLUBLE ADDUCT POLYMERS

| Designation Adduct Polymer Solution | Reactants | Time Required for Complete Solution |
|---|---|---|
| A | 120g polymer No. 1; 30g. acetic acid; 74.4g. formalin (37.5%); 75.6g. water | 4 hours |
| B | 40g. polymer No. 2; 24.2g. formalin (37.5%) 10.3g. phosphoric acid $(H_3PO_4)(85\%)$; 25.5g. water | 4 hours |
| C | 40g. polymer No. 3; 30.8g. formalin (37.5%); 19.2g. hydrochloric acid (37%); 10g. water | 4 hours |
| D | 43.8g. polymer No. 4 11.2g. oxalic acid; 40g. formalin (37.5%); 14.5g. water | 4 hours |
| E | 40g. polymer No. 5; 10g. acetic acid; 25g. formalin (37.5%); 25g water | 24 hours |
| F | 40g. polymer No. 6; 10g $H_3PO_4(85\%)$: 25g. Formalin (37.5%); 65g. water | 100 hours |

TABLE IV

SOLUTIONS OF ADDUCT POLYMER AND NITROGENOUS COMPOUNDS

| Designation of Copolymer Solution | Composition of Solution |
|---|---|
| G | 50g. of Soln. A; 10g. urea; 40g. water |
| H | 20g. soln A; 4g. thiourea; 16g water |
| I | 20g. soln. A; 4g. acrylamide; 16g water |
| J | 20g. soln. A; 4g. trimethylolmelamine, 16g water |
| K | 20g. soln. A; 8g. cyanamide (50%); 12g. water |
| L | 25g. soln B; 5g. urea; 20g. water |
| M | 25g. soln. C; 5g. thiourea; 20g. water |
| N | 25g. of soln. E; 5g. urea; 20g. water |
| O | 30g. soln F; 5g. urea; 15g. water |

TABLE III

USE OF AMMONIA WITH SOLUBLE ADDUCT POLYMERS TO PRODUCE FLAME-RESISTANT FIBROUS ORGANIC MATERIALS

| Fibrous Material Treated | Adduct Polymer Solution See Table II | Amine Used to Cure Adduct | Approx. Add-on of Insoluble Polymer % | Properties of Treated Fibrous Products | | | |
|---|---|---|---|---|---|---|---|
| | | | | Hand | Strength | Color | Match Test Angle |
| Cotton Flannelette | A | $NH_3$ atmosphere | 27 | Crisp | Good | White | 180 |
| PE/cotton blend (50/50) fabric | A | " | 27 | " | " | " | 180 |
| Cotton Sateen | A | $NH_3$ forced thru | 19 | " | " | " | 180 |
| Cotton Flannelette | A<sup>a</sup> | " | 29 | " | " | " | 135 |
| PE/cotton blend 50/50 fabric | A<sup>a</sup> | $NH_3$ forced thru | 27 | " | " | " | 135 |
| Cotton sateen | A<sup>a</sup> | " | 21 | " | " | " | 180 |
| PE/cotton blend (50/50) fabric | B | " | 12 | Good | " | " | 180 |
| Cotton printcloth | D | " | 4 | " | " | " | 90 |
| Cotton sateen | B<sup>a</sup> | " | 12 | Crisp | " | " | 180 |
| PE/cotton blend (50/50) fabric | D<sup>a</sup> | " | 5 | Good | " | " | 45 |

<sup>a</sup>Solution has 38% solids and was neutralized to pH of 6.5.

TABLE V

| SOLUTION USED (Designation from Table III and IV) | Description of Polymer Resulting from Heating the Designated Solution from about 120–150°C for about 1–10 minutes. |
|---|---|
| G | Clear, white, hard polymer insoluble in water and ethanol. Flame and glow resistant. Contains nitrogen and phosphorus. |
| H | Clear, white, hard polymer insoluble in water and ethanol. Flame and glow resistant. Contains nitrogen and phosphorus. |
| I | Tan, foamy polymer insoluble in water and ethanol. Flame and glow resistant. Contains nitrogen and phosphorus. |
| J | Clear, white, hard polymer insoluble in water and ethanol. Flame and glow resistant. Contains nitrogen and phosphorus. |
| K | Clear, white, hard polymer insoluble in water and ethanol. Flame and glow resistant. Contains nitrogen and phosphorus. |
| L | Clear, white, hard polymer insoluble in water and ethanol. Flame |

TABLE V-continued

| SOLUTION USED (Designation from Table III and IV) | Description of Polymer Resulting from Heating the Designated Solution from about 120–150°C for about 1–10 minutes. |
|---|---|
| M | and glow resistant. Contains nitrogen and phosphorus. Clear, white, hard polymer insoluble in water and ethanol. Flame and glow resistant. Contains nitrogen and phosphorus. |
| N | Clear, rubbery, red polymer insoluble in water and ethanol. Flame and glow resistant. Contains nitrogen and phosphorus. |
| O | Clear, hard, gold polymer insoluble in water and ethanol. Flame and glow resistant. Contains nitrogens and phosphorus. |
| A$^a$ | White, hard polymer insoluble in water and ethanols. Flame and glow resistant. Contain nitrogen and phosphorus. |
| A$^b$ | White, hard polymer insoluble in water and ethanol. Flame and glow resistant. Contains nitrogen and phosphorus. |

$^a$Polymer was formed by addition of ammonia or ammonium hydroxide to solution A.
$^b$Same as $^a$except solution A was neutralized to Ph = 6.5 before addition of ammonia or ammonium hydroxide.

TABLE VI

PREPARATION OF FLAME RESISTANT TEXTILES THROUGH USE OF ADDUCT POLYMERS AND NITROGENOUS COMPOUNDS

| Fabric Treated | Solution Applied to Fabric | Conditions for Depositing Insoluble Polymer in Fabric | Approximate Add-On of Retardant After Washing the Treated Textile | Hand | Strength | Color | Match Test Angle |
|---|---|---|---|---|---|---|---|
| PE/cotton blend (50/50) | G | Heat, 150°C 2 min. | 7.0 | Good | Good | White | 75 |
| Rayon | G | " | 15 | Good | Good | White | 120 |
| Cardboard | G | " | 30 | Good | Good | No change | 180 |
| Paper | G | " | 12 | Good | Good | White | 100 |
| Wool | G | " | 13 | Good | Good | White | 180 |
| Jute | G | " | 87 | Good | Good | No change | 100 |
| Cotton Printcloth | H | " | 18 | Good | Good | White | 90 |
| PE/cotton blend (50/50) | H | " | 18 | Good | Good | White | 90 |
| Cotton Sateen | I | " | 18 | Crisp | Good | White | 120 |
| PE/cotton Blend (50/50) | I | " | 22 | Crisp | Good | White | 120 |
| Cotton Printcloth | J | " | 26 | Crisp | Fair | White | 135 |
| PE/Cotton Blend (50/50) | J | " | 31 | Crisp | Good | White | 180 |
| Cotton Printcloth | K | " | 18 | Crisp | Good | White | 110 |
| PE/cotton blend (50/50) | K | " | 20 | Crisp | Good | White | 180 |
| Cotton printcloth | L | " | 9 | Crisp | Good | White | 120 |
| Cotton sateen | M | " | 10 | Good | Good | White | 135 |
| Cotton printcloth | N | " | 11 | Crisp | Good | Yellow | 100 |
| Cotton printcloth | O | " | 16 | Crisp | Good | White | 110 |

We claim:

1. A process for flameproofing organic textiles comprising:
   a. reacting a hydroxymethyl phosphorus compound with a nitrogenous compound to form an insoluble polymeric precipitate,
   b. dissolving the precipitate from (a) in the presence of formaldehyde and an inorganic or organic acid with a mole ratio of 1:4 to 4:1 of formaldehyde to phosphorus contained in the precipitate and a 1:10 to 2:1 ratio of acid to phosphorus contained in the precipitate,
   c. reacting the soluble polymer adduct from (b) with a nitrogenous compound,
   d. wetting a textile fabric with a solution of (c),
   e. drying the wetted fabric from (d) at a temperature from 90°–170°C, and
   f. contacting a fabric wetted with a solution comprising (b) with ammonia or methylamine.
2. The product produced by the process of claim 1.

* * * * *